US006219914B1

(12) United States Patent
Nickel et al.

(10) Patent No.: US 6,219,914 B1
(45) Date of Patent: Apr. 24, 2001

(54) PROCESS FOR PRODUCING A CYLINDER WITH A BULGE

(75) Inventors: Wilheim Nickel, Mülheim; Theodor Schmitz, Grevenbroich; Wilfried Schmidt, Erkrath; Hans-Jürgen Schlüssel, Dormagen, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/407,736

(22) Filed: Sep. 28, 1999

(30) Foreign Application Priority Data

Sep. 28, 1998 (DE) .............................. 198 45 835

(51) Int. Cl.$^7$ ..................................... B23P 11/00
(52) U.S. Cl. ................... 29/888.06; 29/888.061; 29/527.2
(58) Field of Search ............... 29/888.06, 888.061, 29/527.2; 72/41, 42, 267

(56) References Cited

U.S. PATENT DOCUMENTS

| 2,908,385 | * | 10/1959 | Walker | 72/42 |
| 3,818,733 | * | 6/1974 | Cauley et al. | |
| 4,129,022 | * | 12/1978 | Thonnes et al. | |
| 4,928,507 | * | 5/1990 | Staat et al. | |
| 5,310,310 | * | 5/1994 | Nakatsukasa et al. | |

* cited by examiner

Primary Examiner—Irene Cuda
Assistant Examiner—Anthony L. Green
(74) Attorney, Agent, or Firm—Cohen, Pontani, Lieberman & Pavane

(57) ABSTRACT

A process for producing a cylinder having at least one longitudinally extending outward bulge and a steel base, for a piston-cylinder unit. The process including the steps of initially machining a round input ingot to size, the ingot having a length, subsequently heating the ingot to a deformation temperature between 1250° C. and 1310° C., descaling an entire surface of the heated ingot with pressurized water, subsequently inserting the ingot into a mold, piercing the ingot in a sharply increasing manner using a mandrel so as to form a pierced piece with a base, applying a lubricant to the mold and the mandrel prior to piercing, subsequently ejecting the pierced piece from the mold, cooling and descaling the ejected pierced piece, and mechanically finish-machining the pierced piece to produce the cylinder.

10 Claims, 5 Drawing Sheets

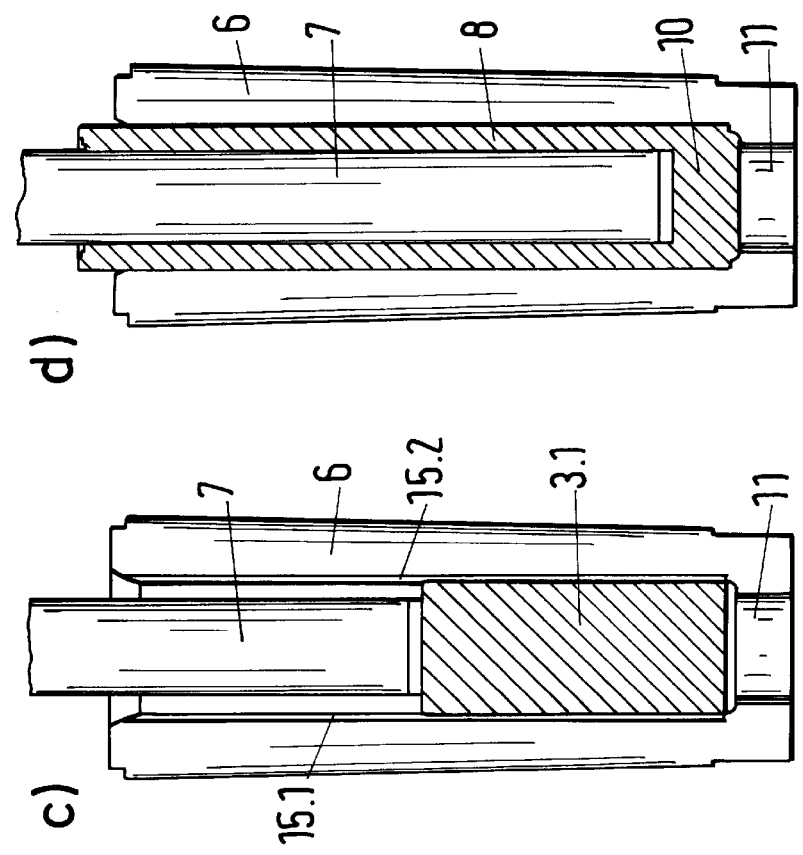
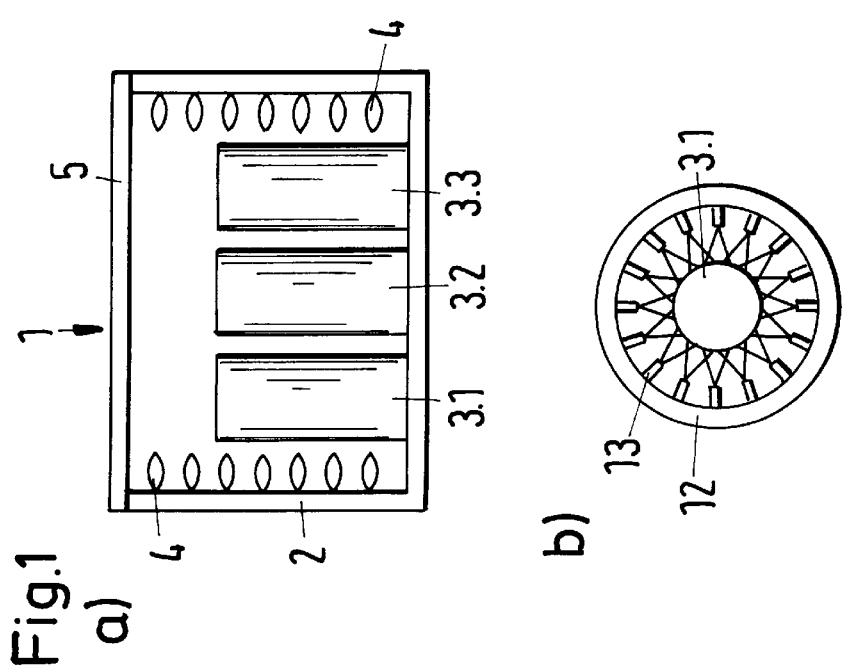
Fig. 1

Fig. 3
a)
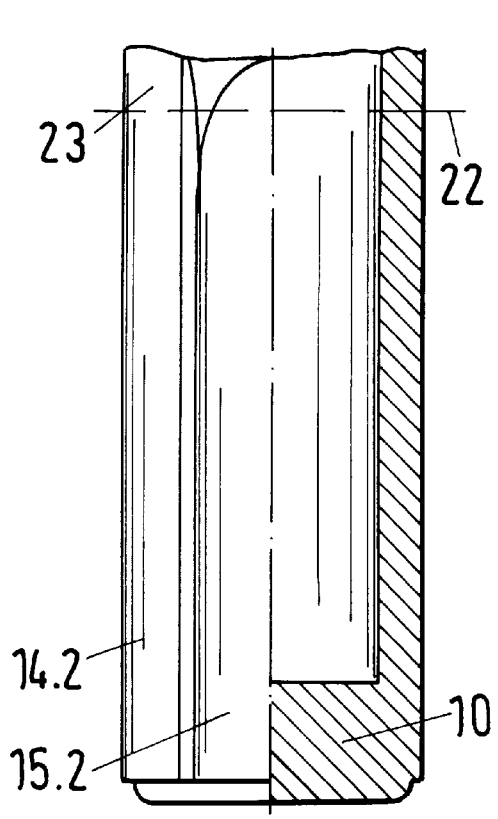
b)
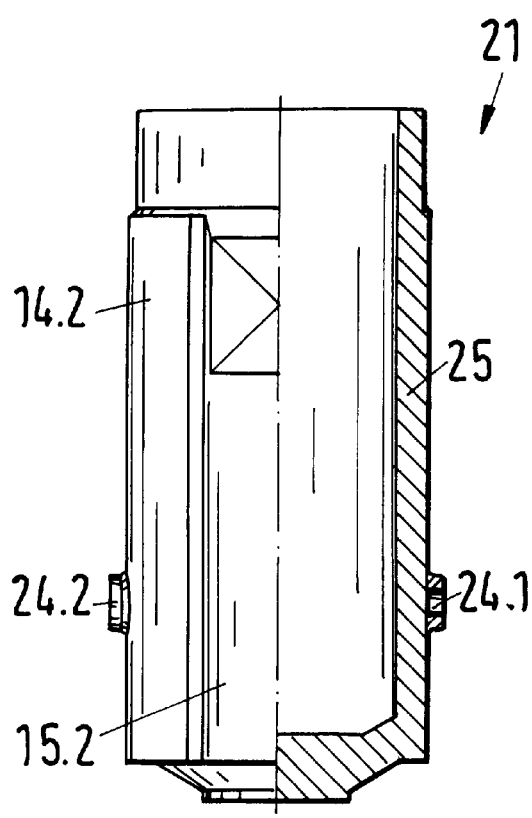
c)
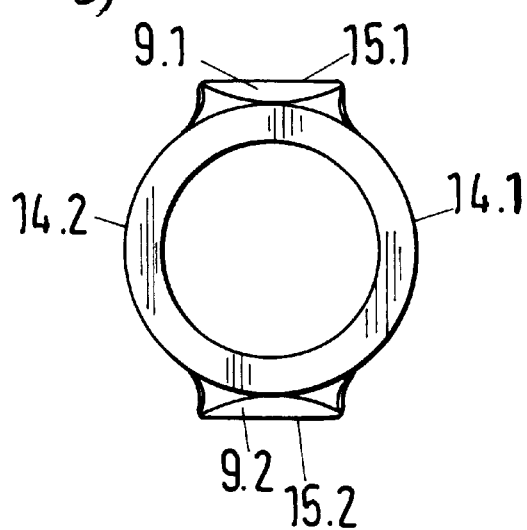
d)
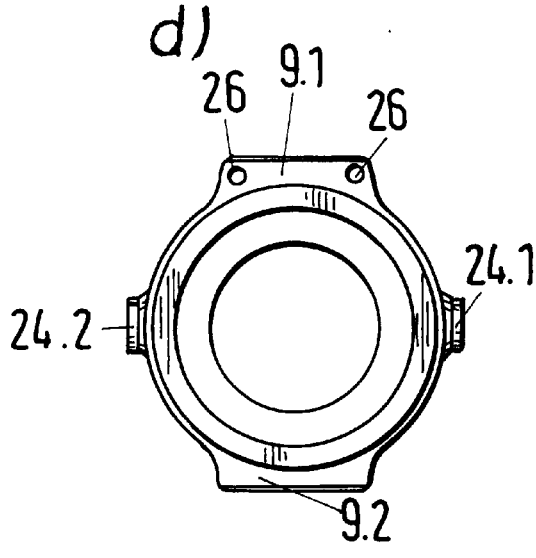

Fig. 5  a)
(A-A)
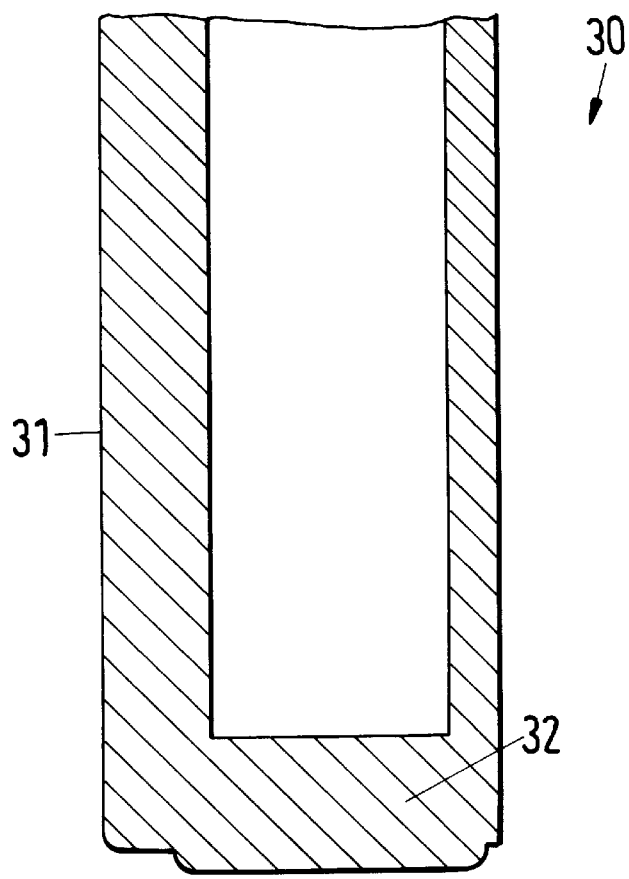
b)
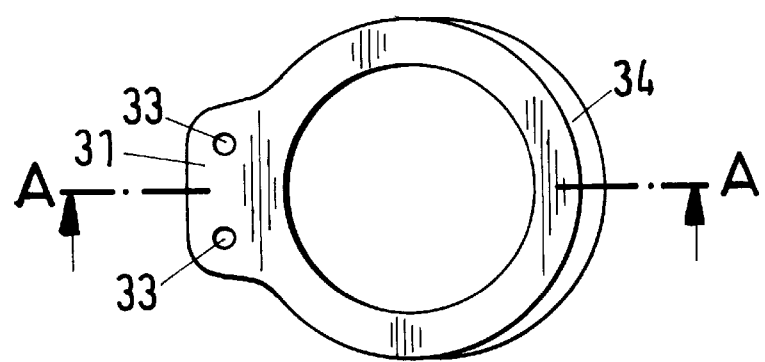

PROCESS FOR PRODUCING A CYLINDER WITH A BULGE

BACKGROUND OF THE INVENTION

1. Field of the Invention

The invention is directed to a process for producing a cylinder with at least one outward bulge extending along its length and with a base made of steel for a piston-cylinder unit.

2. Discussion of the Prior Art

In modern mines, especially in coal mines, a self-advancing support is used in fully mechanized operation. The self-advancing support which supports the hanging roof has at least two hydraulic cylinders or, depending on the size, even four hydraulic cylinders. Problems occurred in the past in arranging the external hydraulic lines at the hydraulic cylinders because the external hydraulic lines were constantly damaged or even destroyed under the rough operating conditions. For this reason, cylinders with bulges were developed, wherein hydraulic ducts were accommodated in the outwardly extending bulge, so that these hydraulic ducts were protected from falling rock. Prior known production of cylinders of this type start with a forged piece which is mechanically machined on all sides. The base is produced separately and connected with the cylindrical part. This known process has to be considered unfavorable with respect to consumption numbers and cycle time.

SUMMARY OF THE INVENTION

Therefore, it is an object of the present invention to provide a process for the production of a cylinder of the type mentioned above which is improved over the known production process with respect to the consumption number, i.e., the ratio of input weight to finished weight, and with respect to the cycle time.

According to the invention, a cropped round ingot or a round continuous-cast ingot is mechanically machined to size, preferably by turning, with a roughness of $R_z \leq 80$ before heating to a temperature between 1250 and 1310° C. After heating, the entire surface is descaled with pressurized water at 300 bar and the ingot is inserted in a mold and pierced in a sharply ascending or increasing manner by means of a mandrel. In so doing, the ingot is lengthened by at least 1.5- to 2.5-times the starting length. The mandrel does not penetrate through the ingot, but rather leaves a base. A lubricant is applied to the mold and mandrel before piercing. This is preferably a mixture of glass powder and pure graphite in a ratio of 1:1, with water glass added. After the pierced piece is ejected from the mold, the outer surface is descaled after cooling. In conclusion, mechanical machining is carried out. Depending on the material and requirements, heat treatment may be necessary and is carried out after the pierced piece is ejected from the mold and before descaling. The heat treatment preferably consists of quenching and tempering in water. The mold is usually arranged vertically, but a horizontal position is also possible.

The advantage of the sharply increasing piercing is that the material is also displaced radially, so that the hollow spaces of the mold forming the bulge are completely filled along a sufficient length. This is conditional upon the mandrel being placed virtually centrically on the ingot. Excessive deviations lead to waste because the bulge is only partially filled. The exact center position of the mandrel is determined in that the mandrel is moved partially into the mold in the cold state and the radial distance from the mold is measured. Accurate adjustment is carried out by means of radial displacement of the mold. In order to assist a centered placement of the mandrel, one portion of the charge ingot or input ingot is mechanically machined to form a cylindrical body and the second portion is mechanically machined to form a conical body, wherein this portion is inserted into the mold. The diameter tolerance of the two portions is in the positive range so as to ensure that the ingot is inserted into the mold in a centered manner.

As a result of the increasing piercing, the mandrel and the mold are highly loaded thermally and it is therefore necessary for the mandrel and mold to be cooled down extensively before the next ingot is inserted. For reasons of dimensioning and with a view to reducing the extent of the final mechanical machining, the conicity or taper of the mold is 0.75%. This is just sufficient to allow the pierced piece to be ejected from the mold by the ejector.

The mold is divided lengthwise and has a cross-sectional contour corresponding to the shape to be produced. In principle, the mold can also be produced in one piece by planing. However, this gives rise to great difficulties and fine machining is problematic. It is simpler to produce a hollow ingot, to divide this hollow ingot longitudinally, and to machine each half mechanically, preferably by cutting. The separately produced base ring is connected with the mold by means of tension bolts so that the machining tool can run out without interference.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIGS. 1a–e show the essential work steps according to the invention for producing a cylinder with two bulges located opposite one another;

FIGS. 3a and 3c show a pressed pierced piece;

FIGS. 3b and 3d show a completely machined cylinder;

FIG. 5a shows a pressed pierced piece with only one bulge in section A—A from FIG. 5b; and FIG. 5b shows a view in direction X from FIG. 5a.

DETAILED DESCRIPTION OF THE PREFERRED EMBODIMENTS

Figure 2:
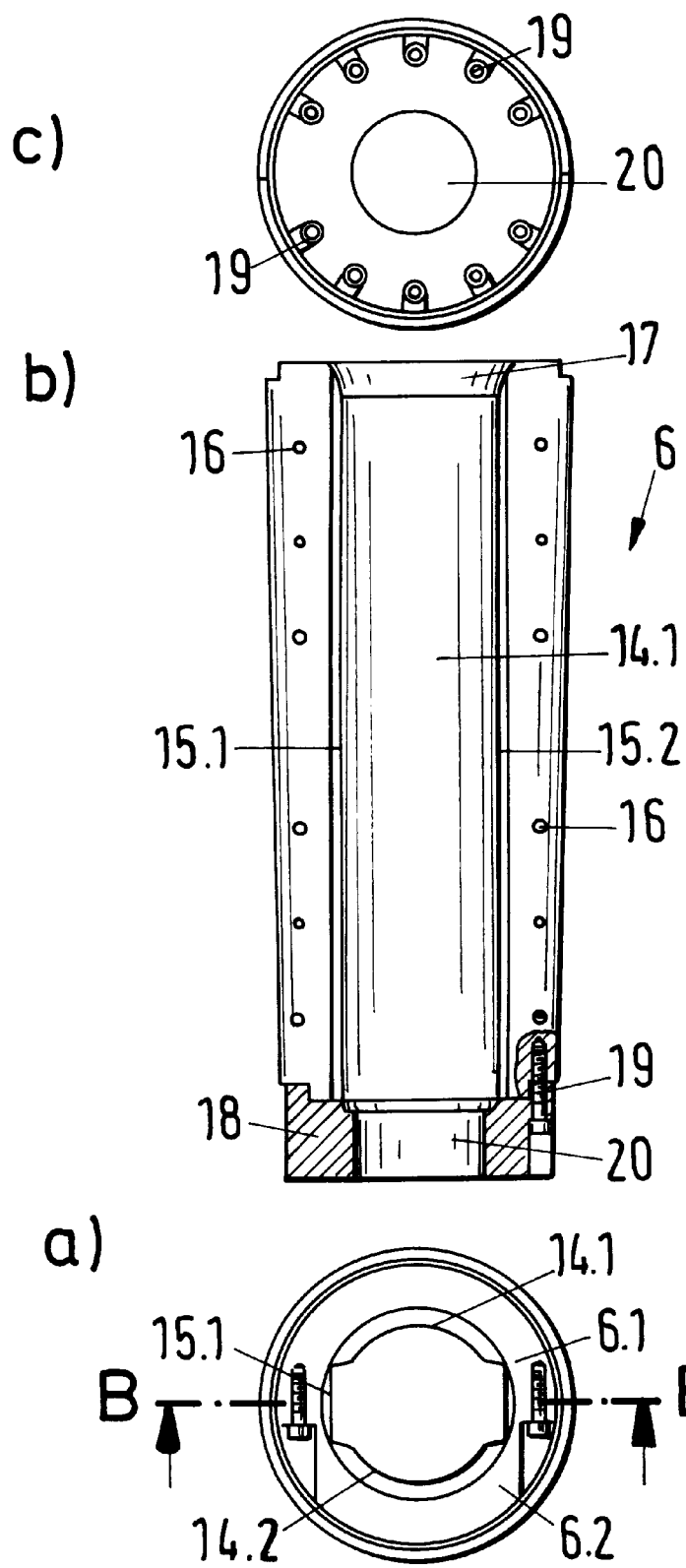
FIGS. 2a and 2b show a mold constructed in accordance with the invention.

The essential work steps, according to the invention, for producing a cylinder with two bulges which are located opposite one another are shown schematically in FIGS. 1a–e. This type of cylinder is also called a finned cylinder. FIG. 1a shows a pit furnace 1 which is heated by gas, wherein three cropped and mechanically machined (FIG. 4) ingots 3.1, 3.2, 3.3 which are to be heated are placed on the base 2 of the pit furnace 1 corresponding to this drawing. The gas heating of the pit furnace 1 is represented symbolically by flames 4. The top part of the pit furnace 1 which is normally open is held closed during the heating by a displaceable cover 5.

The high-pressure descaling of an ingot 3.1 is shown in FIG. 1b. For this purpose, a rinsing ring 12 is arranged concentric to the ingot 3.1 and the outer surface area of the ingot 3.1 is acted upon by water under high pressure by means of the nozzles 13 arranged in the circumferential direction. The pressure is approximately 300 bar. The rinsing ring 12 is moved up and down along the axis of the ingot 3.1. The descaling of the two cover surfaces of the ingot 3.1 is not shown.

FIG. 1c is a longitudinal view showing the work step of inserting the descaled ingot 3.1 in the mold 6 and the setting of the mandrel 7 on the upper cover surface of the ingot 3.1. It is clearly shown that the fin or rib portions 15.1, 15.2 of the mold 6 are not yet filled in this stage of the production process.

FIG. 1d is a longitudinal view showing the mold 6, the mandrel 7 and the pressed pierced piece 8. It can be seen from the top view in FIG. 1e that the hollow spaces forming the ribs 9.1, 9.2 are completely filled with material by means of the sharply increasing piercing. The inserted ingot is not completely perforated but, rather, a base 10 remains. An ejector 11 arranged at the bottom of the press pushes the pierced piece 8 up after pressing, wherein the slight conicity of the mold 6 assists in this respect.

FIG. 2 shows details of the mold 6. The mold 6 is divided along its length according to FIG. 2a with two half-shells 6.1, 6.2. It is clearly shown in this view that the inner surface of the two half-shells 6.1, 6.2 has a cross-sectional contour adapted to the ribbed cylinder to be produced. The cross-sectional contour is essentially characterized by two circular arc-shaped portions 14.1, 14.2 which are located opposite one another and which then pass into the rib portion 15.1, 15.2. In this embodiment, the rib portion 15.1, 15.2 terminates so as to be straight, but it can also be rounded outward somewhat, for example.

FIG. 2b shows a section B—B from FIG. 2a. This section shows tension bolts 16 which connect the two half-shells 6.1, 6.2 and which are arranged so as to be distributed over the length of the mold 6. At the upper open end, the mold 6 has a funnel-shaped portion 17 which is formed integral with the mold 6 and which then passes into the cross-sectional contour shown in FIG. 2a. A base ring 18 which is connected with the mold 6 via tension bolts 19 is arranged at the lower open end of the mold 6.

FIG. 2c shows the underside of the mold with the opening 20 for the arrangement of the ejector 11 (FIG. 1d) and the tension bolts 19 which are arranged so as to be distributed along the circumference.

FIGS. 3a and 3c show the pressed pierced piece 8 in longitudinal half-section and in a half-plan view and top view, and FIGS. 3b and 3d show similar views of the completely machined ribbed cylinder 21.

In a direct comparison between FIG. 3c and FIG. 3d, it can be seen that the part 23 of the pierced piece 8 located above the dashed line 22 is cut off. An eye or boss 24.1, 24.2 is welded on at the right-hand and left-hand sides in the lower third of the cylindrical part, so that the ribbed cylinder 21 can be arranged in a swivelable manner in the piston-cylinder unit, not shown. The base 10 of the pierced piece 8 is mechanically machined so as to have a contour adapted to the setup or erect conditions. The inner surface 25 of the pierced piece 8 is finely turned and honed, so that the piston of the piston-cylinder unit can slide therein.

FIG. 3b shows the ducts 26 which are arranged in the rib 9.1 located at the top in this view. Depending on requirements, ducts can also be arranged in the oppositely located rib 9.2.

Figure 4:
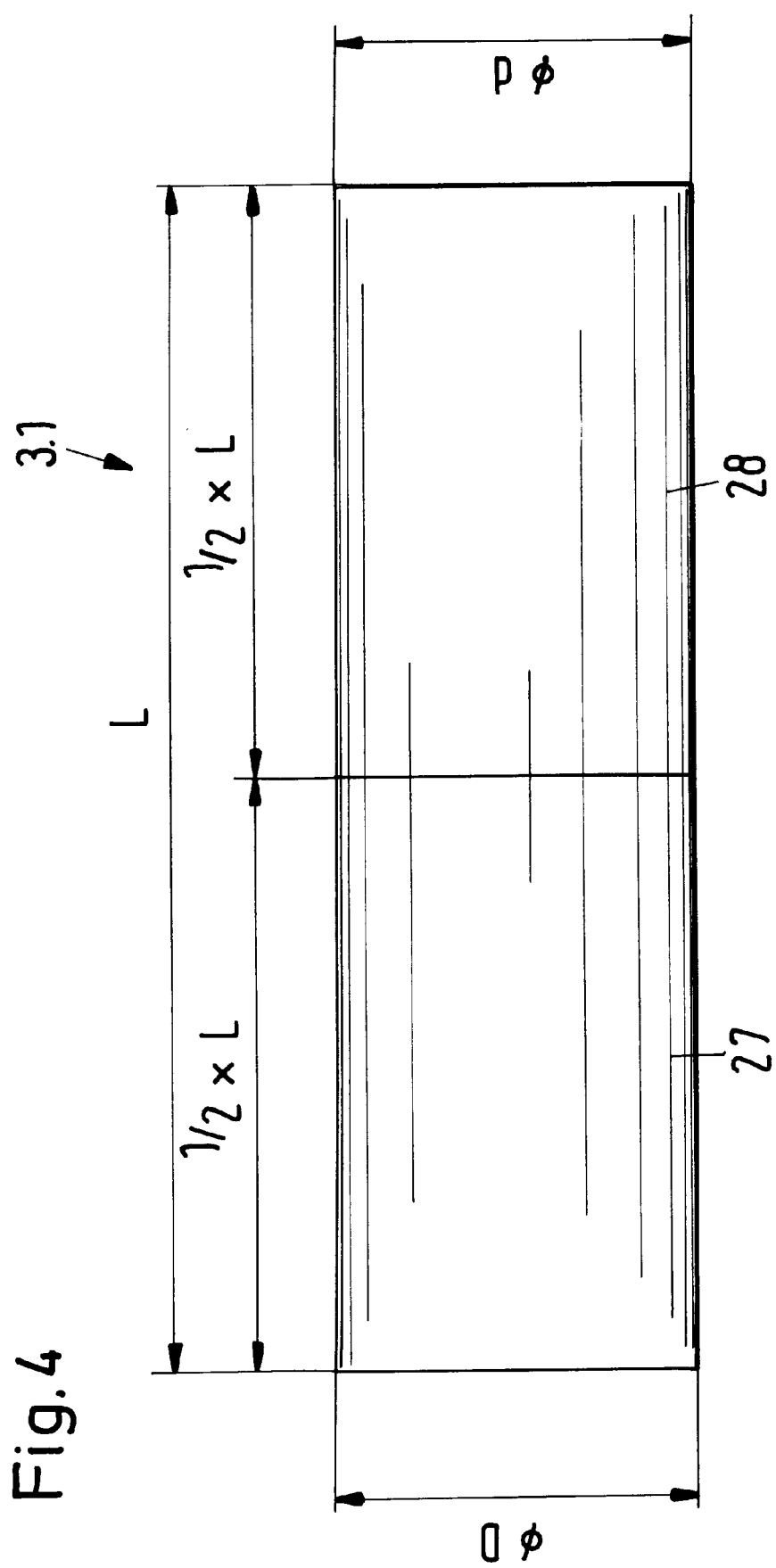
FIG. 4 shows a mechanically machined input ingot.

FIG. 4 shows, by way of example, a mechanically machined ingot 3.1 prior to insertion in the pit furnace 1 (FIG. 1a). A first portion 27 of the ingot 3.1 is mechanically machined to form a cylindrical body with a diameter D. A second portion 28 adjoining this first portion 27 is mechanically machined to form a conical body with an initial diameter D and an end diameter d. Both diameters have a tolerance zone from zero to positive x. For example, the value of x is one millimeter. Each portion 27, 28 preferably has the same length, wherein this length corresponds to half of the insertion length L. The difference in diameter between D and d is several millimeters, preferably five millimeters.

FIGS. 5a and 5b show a pressed pierced piece 30 in section and in a plan view with only one bulge 31. This pierced piece 30 also has a pressed base 32 which is an integral component part of the pierced piece 30. Ducts 33 for the hydraulic lines can be arranged in the bulge 31 comparable to FIG. 3b. The pierced piece 30 having only one bulge 31 is more difficult to produce than the ribbed cylinder 21 (FIG. 3) described above because the mandrel 7 (FIGS. 1c, 1d) can run more easily during the piercing process. It is possible to carry out a compensatory control or counter-control, for example, in such a way that more material 34 remains on the side located opposite the bulge 31—as is indicated by the dashed lines in FIG. 5b—without a significant second bulge being formed directly.

The invention is not limited by the embodiments described above which are presented as examples only but can be modified in various ways within the scope of protection defined by the appended patent claims.

We claim:

1. A process for producing a cylinder having at least one longitudinally extending outward bulge and a steel base, for a piston-cylinder unit, comprising the steps of:
   initially machining a round input ingot to size, the ingot having a length;
   subsequently heating the ingot to a deformation temperature between 1250° C. and 1310° C.;
   descaling an entire surface of the heated ingot with pressurized water;
   subsequently inserting the ingot into a mold;
   piercing the ingot in a sharply increasing manner using a mandrel so as to form a pierced piece with a base;
   applying a lubricant to the mold and the mandrel prior to piercing;
   subsequently ejecting the pierced piece from the mold;
   cooling and descaling the ejected pierced piece; and
   mechanically finish-machining the pierced piece to produce the cylinder.

2. A process according to claim 1, wherein the initial machining step includes mechanically machining a first portion of the input ingot to form a cylindrical body and mechanically machining a second portion to form a conical body having a decreasing diameter that faces an end face of the ingot.

3. A process according to claim 2, wherein each portion of the ingot is of equal length that corresponds to half the length of the input ingot, each portion having a diameter tolerance in a positive range.

4. A process according to claim 2, wherein the input ingot is mechanically machined by turning with a roughness of $R_z \leq 80$.

5. A process according to claim 1, and further comprising the step of adjusting a center position of the mandrel relative to the mold before inserting the heated ingot into the mold.

6. A process according to claim 1, wherein the piercing step includes piercing the heated ingot to increase in length at least by 1.5- to 2.5- times from the starting length.

7. A process according to claim 1, and further-comprising the step of intensively cooling the mandrel and the mold after ejection of the pierced piece from the mold.

8. A process according to claim 1, wherein the lubricant is a mixture of glass powder and pure graphite in a ratio of 1:1, with water glass added.

9. A process according to claim 2, wherein the inserting step includes inserting the mechanically machined input ingot into the mold by its conically formed second portion.

10. A process according to claim 1, and further comprising the step of heat treating the pierced piece after the pierced piece is ejected from the mold and prior to the descaling.

* * * * *